Dec. 6, 1927.
T. B. POLK
1,652,150
COMBINED WINDSHIELD FRAME AND WIPER MOTOR
Filed Jan. 26, 1924
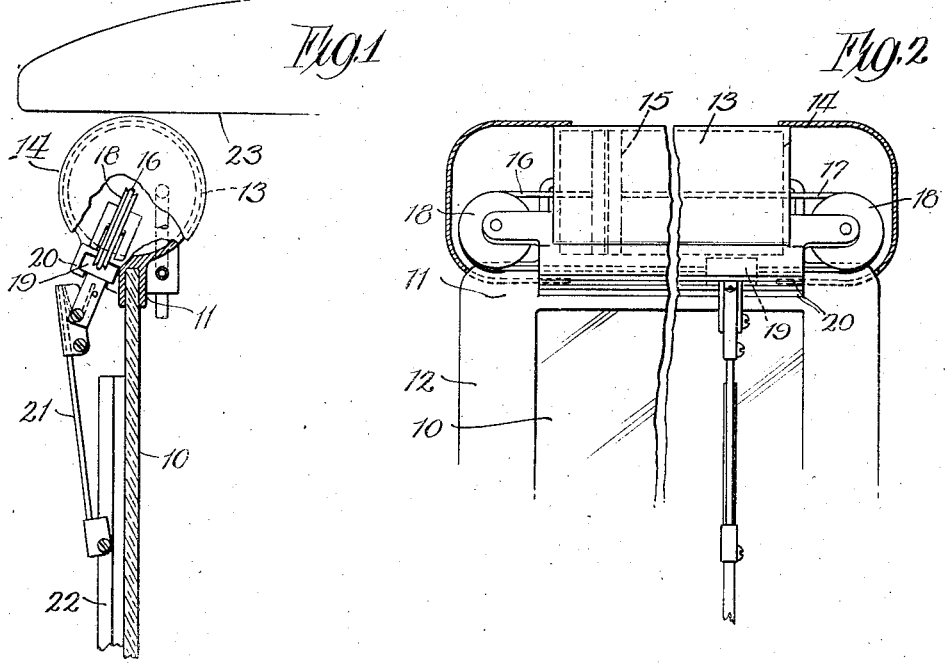
Inventor
Thomas B. Polk
by Burton & Burton
his Atty's Patented Dec. 6, 1927.

1,652,150

UNITED STATES PATENT OFFICE.

THOMAS B. POLK, OF SEATTLE, WASHINGTON, ASSIGNOR, BY MESNE ASSIGNMENTS, TO TRICO PRODUCTS CORPORATION, OF BUFFALO, NEW YORK.

COMBINED WINDSHIELD FRAME AND WIPER MOTOR.

Application filed January 26, 1924. Serial No. 688,893.

This invention relates to improvements in automatic windshield cleaners, and more particularly to means of mounting the same.

One object of the invention is to provide a structure wherein the fluid actuated motor of the cleaner is combined with the windshield frame in such wise that the movable element thereof is housed within one of the members of said frame.

Other objects as well as the advantages of the invention will appear from the following description taken in connection with the accompanying drawings wherein two forms of the invention are illustrated.

In the drawings:

Fig. 1 is a vertical fore-and-aft sectional view showing the automatic windshield cleaner of the fluid actuated type combined with one of the frame members of the windshield and the combined structure operatively mounted on said shield.

Fig. 2 is a front elevation of the structure shown in Fig. 1.

As above pointed out, it is contemplated, according to the present invention, to combine the windshield cleaning apparatus with the frame of the windshield in such wise that the housing element for the movable member of the fluid actuated motor forms a part (integral or otherwise) of said frame. In Figs. 1 and 2 one embodiment of such a structure or combination is illustrated, wherein the windshield is shown at 10, and is provided with top and side frame members 11 and 12, respectively. In these figures the top frame member 11 is constructed as an integral part of the cylinder 13 of the fluid actuated motor having end caps 14. This particular motor forms the subject-matter of my co-pending application filed January 26, 1924, Serial No. 688,892, and is shown herein merely for illustrative purposes. Briefly stated, it comprises the stationary outer cylinder 13, previously mentioned, in which is mounted a reciprocable piston 15. Cables 16 and 17 are attached to the opposite faces of the piston and extend over suitable pulleys 18 at opposite ends of the cylinder and exteriorly thereof to a slide block 19 carried in guide-ways 20 beneath said cylinder. The flanges forming the guide 20 as well as those forming the grooves to receive the glass are preferably formed integral with the cylinder 13 and are substantially radial of the cylinder so that the carrier 19 will diverge downwardly from the windshield glass. The cylinder is connected through suitable conduits with a partial vacuum or pressure producing means and automatic valve mechanism, not shown, is provided for controlling the fluid flow so as to produce the desired operation. Supported in any suitable manner from the slide block 19 is a wiper arm 21 carrying at its lower end the wiper element 22 which engages the glass of the windshield in the usual manner. The front portion of the top of the vehicle is shown at 23. The pulleys 18 are readily accessible by removing the end caps 14.

In practice it is preferred to construct the cylinder 13 of the motor of a length substantially co-extensive with the width of the shield so that no open spaces will be left at either end thereof intermediate the windshield and the vehicle top.

The movable element of the motor (piston or cylinder) is housed within the top frame member of the windshield or a part thereof, and is combined therewith in such wise as to form a unitary structure, the cylinder of the motor forming a part of the top frame member.

Obviously, the invention is susceptible of changes and modifications without departing from the spirit thereof, and it is not therefore desired to limit the same except where limitations appear in the appended claims.

What I claim is:—

1. A combined windshield and cleaner construction, comprising a cleaner motor including a cylinder and a piston operable therein, the cylinder having on its periphery a pair of flanges forming a groove to receive the edge of the windshield glass, said cylinder also having on its periphery and forwardly of said flanges a guide extending substantially parallel to said flanges and lengthwise of the cylinder, a wiper carrier operable by the piston and slidable along the guide on the exterior of the cylinder, and a wiper element operable by said carrier.

2. A combined windshield and cleaner construction, comprising a cleaner motor including a cylinder and a piston operable therein, the cylinder having on its periphery a pair of flanges forming a groove to receive the edge of the windshield glass, said cylinder also having on its periphery and forwardly of said flanges a second pair of flanges defining a guideway, said formed groove and guideway extending radially from the periphery of the cylinder and being relatively divergent therefrom, a carrier slidable in the guideway and having a part extending radially from the cylinder and away from the plane of a windshield glass when engaged in the groove, and a wiper arm resiliently carried on the outer end of said carrier part.

3. A combined windshield and cleaner construction, comprising a cleaner motor including a cylinder and a piston operable therein, the cylinder having on its periphery a pair of flanges forming a groove to receive the edge of the windshield glass, said cylinder also having on its periphery and forwardly of said flanges a guideway, a carrier slidable in the guideway, pulleys mounted adjacent the opposite ends of the cylinder with their axes substantially at right angles to the radially plane extending through the guideway, whereby said pulleys will be inclined from the groove, and a cable extending from the opposite sides of the piston through the ends of cylinder and taking over the pulleys for connecting the piston to said carrier.

In testimony whereof, I have hereunto set my hand at Chicago, Illinois, this 14th day of January, 1924.

THOMAS B. POLK.